(12) United States Patent  
Schneider et al.

(10) Patent No.: US 10,948,030 B2
(45) Date of Patent: Mar. 16, 2021

(54) CLUTCH ARRANGEMENT

(71) Applicant: ZF Friedrichshafen AG, Friedrichshafen (DE)

(72) Inventors: Christian Schneider, Hammelburg (DE); Alessio Paone, Werneck (DE); Andreas Thiede, Dittelbrunn (DE); Troy Menebroker, Plymouth, MI (US); Richard Wu, Westland, MI (US); Jorge Cisneros, Ann Arbor, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

(21) Appl. No.: 16/273,873

(22) Filed: Feb. 12, 2019

(65) Prior Publication Data
US 2020/0232523 A1 Jul. 23, 2020

(30) Foreign Application Priority Data

Jan. 22, 2019 (DE) ...................... 10 2019 200 722.8

(51) Int. Cl.
*F16D 25/0635* (2006.01)
*F16D 121/04* (2012.01)
(52) U.S. Cl.
CPC ...... *F16D 25/0635* (2013.01); *F16D 2121/04* (2013.01); *F16D 2300/14* (2013.01)

(58) Field of Classification Search
CPC ............. F16D 25/0635; F16D 2121/04; F16D 2300/14
See application file for complete search history.

(56) References Cited

U.S. PATENT DOCUMENTS 5,799,762 A * 9/1998 Hinkel .................... F16H 45/02
192/3.29

FOREIGN PATENT DOCUMENTS

DE 198 36 775 3/1999

* cited by examiner

*Primary Examiner* — Huan Le
(74) *Attorney, Agent, or Firm* — Cozen O'Connor

(57) ABSTRACT

Clutch arrangement provided with a housing and a clutch device, one of which serves as a clutch element carrier for a clutch element and the other serves as a friction region carrier. The clutch element has a carrier for a friction lining and a holding apparatus for receiving the carrier on the clutch element carrier, radially adjacently with respect to the friction lining. In a first radial region, the clutch housing has an axial projection at a first axial spacing from the clutch device and, with a radial offset with respect thereto, has an axial recess at a second axial spacing from the clutch device in a second radial region, and has a transition region radially between the axial projection and the axial recess, either the axial projection or the axial recess being intended to provide a bearing face for at least one component of the clutch device.

7 Claims, 2 Drawing Sheets

CLUTCH ARRANGEMENT

BACKGROUND OF THE INVENTION

1. Field of the Invention

The invention relates to a clutch arrangement having a clutch housing and a clutch device, of which one structural unit, that is to say the clutch housing or the clutch device, serves at least indirectly as a clutch element carrier for at least one clutch element, and having at least one friction region carrier for at least one friction region, with the result that the at least one clutch element can be brought at least substantially into an operative connection with the at least one friction region to establish a non-positive connection, or the at least one clutch element can be at least substantially disconnected from the at least one friction region in order to cancel the non-positive connection, the at least one clutch element having a carrier for at least one friction lining, and, radially adjacently with respect to the friction lining, the at least one clutch element having a holding apparatus for receiving the carrier of the clutch element on the clutch element carrier.

2. Description of the Related Art

A clutch arrangement of this type is known from DE 198 36 775 B4. The carrier of the clutch element is fastened radially adjacently with respect to the friction lining to a clutch device, which is configured as a clutch piston, by a riveted connection. By way of axial movement of the clutch piston in the direction of the clutch housing, the clutch element comes to bear with its friction lining, which is provided on the side of the clutch housing, against the friction region of the clutch housing, with the result that a non-positive connection is produced between the friction lining and the friction region and therefore also between the clutch housing and the clutch device. As a result, the movement of the clutch housing is transmitted to the clutch device. Conversely, if the friction lining of the clutch element is released from the friction region of the clutch housing by way of axial movement of the clutch piston in the opposite direction, the non-positive connection between the friction lining and the friction region and therefore also between the clutch housing and the clutch device is cancelled again.

In the case of the known clutch arrangement, a single friction lining is shown in interaction with a single friction region, which may be sufficient to transmit low torques. If a clutch device of structurally different configuration had to be used for the transmission of higher torques, the clutch arrangement does not offer a solution for accommodating it in the clutch housing.

SUMMARY OF THE INVENTION

One aspect of the invention is based on configuring a clutch arrangement such that its clutch housing is suitable for receiving different clutch arrangements.

According to one aspect of the invention, it is provided to configure a clutch arrangement having a clutch housing and having a clutch device, of which one structural unit, that is to say the clutch housing or the clutch device, serves at least indirectly as a clutch element carrier for at least one clutch element, and having at least one friction region carrier for at least one friction region, with the result that the at least one clutch element can be brought at least substantially into an operative connection with the at least one friction region in order to establish a non-positive connection, or the at least one clutch element can be at least substantially disconnected from the at least one friction region to cancel the non-positive connection, the at least one clutch element having a carrier for at least one friction lining, and, radially adjacently with respect to the friction lining, the at least one clutch element having a holding apparatus for receiving the carrier of the clutch element on the clutch element carrier.

It is of particular significance that, in a first radial region, the clutch housing has an axial projection at a first axial spacing from the clutch device and, with a radial offset with respect thereto, an axial recess at a second axial spacing from the clutch device in a second radial region, and a transition region radially between the axial projection and the axial recess, either the axial projection or the axial recess being intended to provide a bearing face for at least one component of the clutch device in a manner which is dependent on the configuration of the clutch device.

As a result of an embodiment of this type, the clutch housing has different bearing faces that make it possible to receive different clutch devices. Thus, for example, the bearing face of the axial recess can be used in a very advantageous way to interact with a clutch device, the clutch element carrier of which is intended to receive a single clutch element. In order to make the full movement capability in the axial direction of the clutch element carrier possible in the case of a construction of this type of the clutch device, it can be appropriate to use the axial projection of the clutch housing as an axial penetration space, in particular during the establishing of a non-positive connection between the at least one clutch element and the at least one friction region.

Concerning the bearing face of the axial projection, the bearing face can be used in a likewise advantageous way to interact with a clutch device, in the case of which at least one clutch element carrier is intended to receive a plurality of clutch elements. In the meantime, the axial recess of the clutch housing can provide a clearance for the arrangement of further components, such as a torsional vibration damper or an absorber system, in a manner which is axially adjacent with respect to the bearing face of the said axial recess.

One advantageous special feature of the clutch housing consists in the transition region of the axial projection changing into the axial recess by a double directional change, a first directional change bringing about a course change of the clutch housing from substantially radial to substantially axial, and a second directional change bringing about a course change from substantially axial to substantially radial.

A particularly compact receiving situation for a clutch device, the clutch element carrier of which is intended to receive a plurality of clutch elements, consists in guiding the clutch element carrier radially as far as directly up to the first directional change of the course direction of the clutch housing from substantially radial to substantially axial, in order to support the clutch element carrier at least partially against radial forces by way of the clutch housing as a result, and to relieve a possibly present connecting region between the clutch housing and the clutch element carrier as a result.

In one preferred embodiment, in the case of a clutch device, in which a clutch element carrier is intended to receive a single clutch element, the clutch element is fastened to the clutch element carrier, and has at least one friction lining which is fastened to the clutch element carrier by a carrier with a radial offset with respect to the friction lining. In contrast to this, in the case of a clutch device which has a plurality of clutch elements, a first clutch element carrier is preferably provided for at least one first clutch element and a second clutch element carrier is provided for at least one second clutch element, of which clutch element carriers one clutch element carrier is fastened to the bearing face of the axial projection of the clutch housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following text, the clutch arrangement is shown using exemplary embodiments. In the drawing.

DETAILED DESCRIPTION OF THE PRESENTLY PREFERRED EMBODIMENTS

Figure 1:
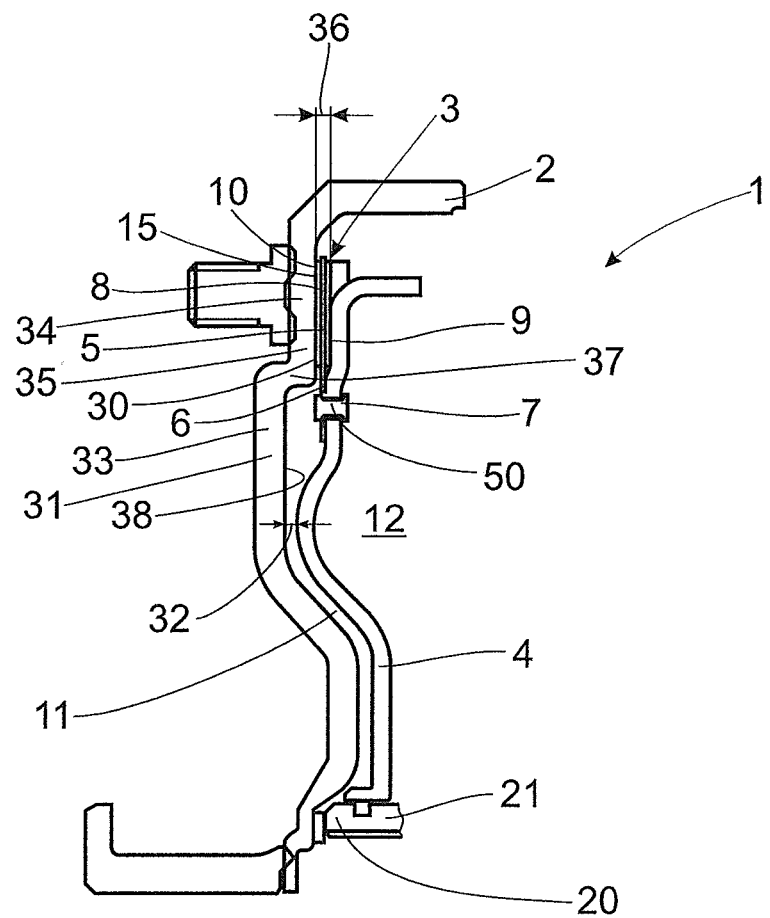
FIG. 1 is a clutch housing and a clutch device, a clutch element being fastened to a clutch element carrier of the clutch device.

FIG. 1 shows a region of a clutch arrangement 1 that has a clutch housing 2 and a clutch device 3. The clutch device 3 is provided with a clutch element carrier 4 in the form of a clutch piston and with a clutch element 5 that is fastened thereto, the clutch element carrier 4 being received in an axially movable manner on a hub 21 of an output 20. The clutch element 5 has a carrier 6, which is fastened to the clutch element carrier 4 by a riveted connection 7, which serves as a holding apparatus 50, and which carrier 6 has a first friction lining 8 on its side that faces the clutch housing 2 and a second friction lining 9 on its side that faces away from the clutch housing 2.

The clutch element carrier 4 can be moved axially, between a first position, in which it presses the clutch element 5 and therefore the first friction lining 8 against a friction region 10 on the clutch housing 2, which serves as a friction region carrier 15, or a second position, in which it is remote from the friction region 10 of the friction region carrier 15 of the clutch housing 2, and therefore no longer exerts a pressing force on the clutch element 8. The first position is assumed if the pressure in a first pressure space 11 axially between the clutch housing 2 and the clutch element carrier 4 is lower than in a second pressure space 12 on the opposite side of the clutch element carrier 4. The clutch device 3 is then engaged. In contrast to this, the second position is assumed if the pressure in the first pressure space 11 is higher than in the second pressure space 12. The clutch device 3 is then disengaged.

The friction region 10 of the clutch housing 2 serves as a bearing face 30, as has already been explained. Journals 22 are provided on that side of the clutch housing 2 that faces away from the said bearing face 30, which journals 22 serve to connect the clutch housing 2 to a drive (not shown), such as the crankshaft of an internal combustion engine. Opposite a radially further inwardly lying radial region 31 of the clutch housing 2, which radial region 31 is arranged at a first axial spacing 32 from the clutch device 3 and forms an axial projection 33 of the clutch housing 2, which axial projection 33 has a bearing face 38, the radial region 34 that receives the journals 22 and has the bearing face 30 acts as an axial recess 35 of the clutch housing 2, which axial recess 35 is arranged at a second axial spacing 36 from the clutch device 3. A transition region 37 is provided between the first radial region 31 and the second radial region 34, which transition region 37 changes the axial projection 33 into the axial recess 35 by a double directional change, a first directional change bringing about a course change of the clutch housing 2 from substantially radial to substantially axial, and a second directional change bringing about a course change from substantially axial to substantially radial.

In the case of the movement of the clutch element carrier 4 into its engaged position, the clutch element 5 comes to bear with the first friction lining 8 against the second bearing face 30 on the axial recess 35, whereas the first bearing face 38 on the axial projection 33 can be used as an axial penetration space 47 for an axially bulged region on the clutch element carrier 4.

Figure 2:
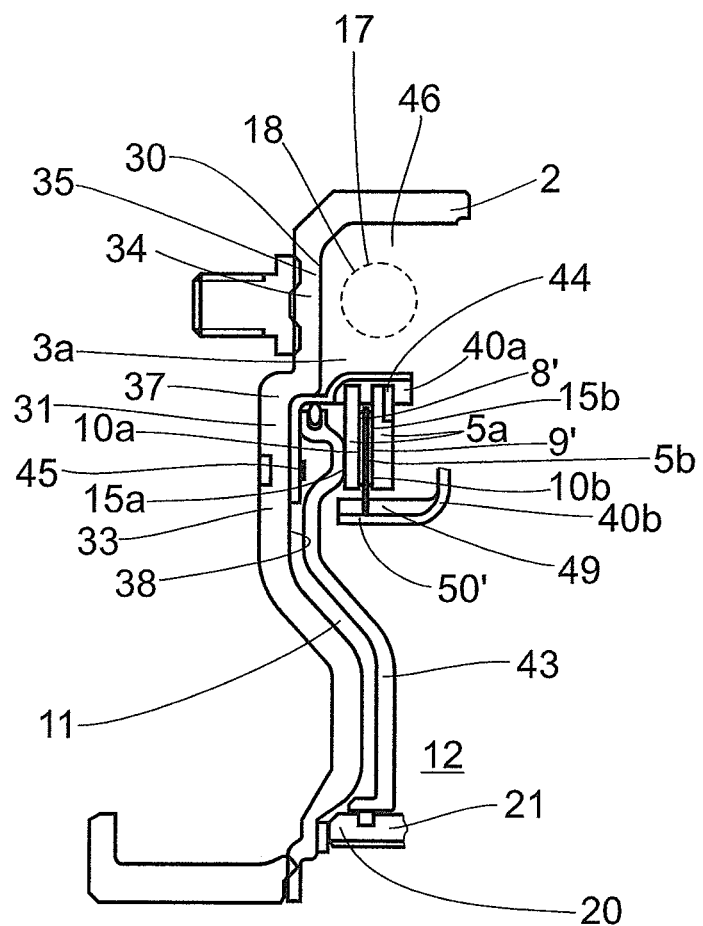
FIG. 2 is a clutch device having two clutch element carriers which together serve to receive a plurality of clutch elements.

Whereas there is merely one clutch element 5 in the case of the embodiment according to FIG. 1, FIG. 2 shows an embodiment with a plurality of clutch elements 5a, 5b. A first clutch element carrier 40a is fastened to the clutch housing 2, to be precise to the bearing face 38 of the axial projection 33 of the clutch housing 2. Whereas the first clutch element carrier 40a receives the first clutch elements 5a fixedly so as to rotate with it, but in an axially movable manner, the second clutch elements 5b are likewise received on a second clutch element carrier 40b fixedly so as to rotate with it, but in an axially movable manner, which second clutch element carrier 40b is connected to the hub 21 of the output 20. If a clutch piston 43 is loaded in a direction that points away from the clutch housing 2 by way of a positive pressure in the first pressure space 11 in comparison with the second pressure space 12, the clutch piston 43 comes to bear against the adjacent first clutch element 5a with the exertion of an axial force. As a result, an operative connection with the at least one further first clutch element 5a is established via the at least one second clutch element 5b until the last clutch element 5a in this series is supported axially on the first clutch element carrier 40a via a securing ring 44. The clutch device 3a is then engaged, the friction linings 8' and 9' being provided in each case on a carrier 6a in the case of this exemplary embodiment, via which carrier 6a the connection, which is fixed so as to rotate with it, but axially movable, of the second clutch element 5b with respect to the second clutch element carrier 40b is established, by a toothing portion 49 being provided as a holding apparatus 50' between the carrier 6a of the second clutch element 5b and the second clutch element carrier 40b. In contrast, the first friction linings 5a in each case provide the friction region 10a, 10b, and accordingly serve in each case as friction region carriers 15a, 15b. In order to disengage the clutch device 3a, a positive pressure with respect to the first pressure space 11 is established in the second pressure space 12, and the clutch piston 43 is released from the adjacent first clutch element 5a as a result.

The first clutch element carrier 40a is preferably positioned in the transition region 37 of the clutch housing 2, such that the clutch element carrier 40a is guided radially as far as directly up to the first directional change of the clutch housing 2 from substantially radial to substantially axial. Positioned in this way on the bearing face 38 of the axial projection 33, the clutch element carrier 40a can be supported radially on the transition region 37. The fastening of the clutch element carrier 40a to the axial projection takes place by means of a pushed-through riveted connection 45.

Since, in the case of this embodiment, the clutch element carrier 40a is provided on the first bearing face 38 on the axial projection 33 and therefore in the first radial region 31, the second radial region 34, which lies radially outside, the second bearing face 30 on the axial recess 35 remains free, with the result that a clearance 46 remains axially adjacently with respect to the second bearing face 30 on the axial recess 35 for the arrangement of further components, such as a peripheral spring assembly 17 (illustrated diagrammatically using dashed lines) of a torsional vibration damper 18.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch arrangement comprising:
   a clutch housing;
   a clutch device;
   at least one clutch element;
   a clutch element carrier, wherein one of the clutch housing or the clutch device serves at least indirectly as the clutch element carrier for the at least one clutch element,
   at least one friction region carrier for at least one friction region, wherein the at least one clutch element can be brought at least substantially into an operative connection with the at least one friction region to establish a non-positive connection, or the at least one clutch element can be at least substantially disconnected from the at least one friction region in order to cancel the non-positive connection,
   the at least one clutch element having a carrier for at least one friction lining, and, radially adjacently with respect to the at least one friction lining, the at least one clutch element having a holding apparatus for receiving the carrier of the at least one clutch element on the clutch element carrier;
   wherein, in a first radial region, the clutch housing comprises:
   an axial projection at a first axial spacing from the clutch device and, with a radial offset with respect thereto,
   an axial recess at a second axial spacing from the clutch device in a second radial region, and
   a transition region radially between the axial projection and the axial recess,
   either the axial projection or the axial recess configures to provide a bearing face for at least one component of the clutch device based on a configuration of the clutch device,
   wherein at least one clutch element carrier is configured to receive a plurality of clutch elements,
   wherein the clutch element carrier uses the bearing face of the axial projection,
   whereas the axial recess provides a clearance for the arrangement of a peripheral spring assembly of a torsional vibration damper, in a manner which is axially adjacent with respect to the bearing face of the axial recess.

2. The clutch arrangement according to claim 1,
   wherein the clutch element carrier is configured to receive a single clutch element,
   wherein the single clutch element is provided to use the bearing face of the axial recess,
   whereas the clutch element carrier uses the axial projection of the clutch housing as an axial penetration space, during the establishing of the non-positive connection between the at least one clutch element and the at least one friction region.

3. The clutch arrangement according to claim 2, wherein the at least one clutch element is fastened to the clutch element carrier and has at least one friction lining.

4. The clutch arrangement according to claim 1,
   wherein the transition region is configured to change the axial projection into the axial recess by a double directional change, a first directional change bringing about a course change of the clutch housing from substantially radial to substantially axial, and a second directional change bringing about a course change from substantially axial to substantially radial.

5. The clutch arrangement according to claim 4, wherein the clutch element carrier which uses the bearing face of the axial projection is guided radially as far as directly up to the first directional change from substantially radial to substantially axial.

6. The clutch arrangement according to claim 1, wherein the first axial spacing of the clutch housing from the clutch device is greater than the second axial spacing of the clutch housing from the clutch device.

7. The clutch arrangement according to claim 1, wherein the clutch device has a first clutch element carrier for at least one first clutch element and a second clutch element carrier for at least one second clutch element, of which first and second clutch element carriers, one of the first and second clutch element carriers is fastened to the bearing face on the axial projection of the clutch housing.

* * * * *